4 Sheets—Sheet 1.
T. E. JEFFERSON.
Sulky-Plow.
No. 215,929. Patented May 27, 1879.
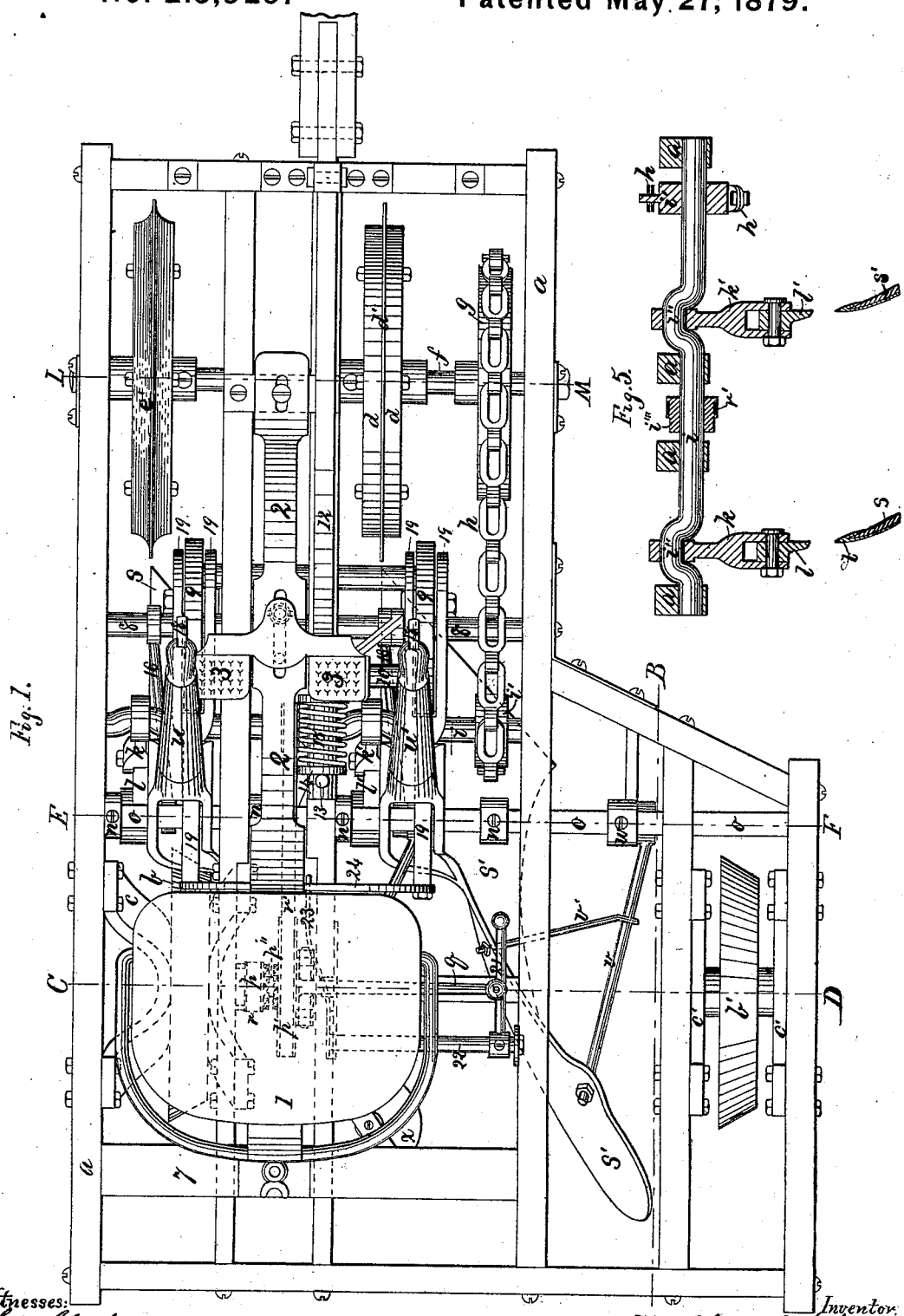
Witnesses:
Henry Chadbourn
F. Allen
Inventor:
Thomas E. Jefferson
by Hiddy Andrew
his atty.

4 Sheets—Sheet 2.
T. E. JEFFERSON.
Sulky-Plow.
No. 215,929. Patented May 27, 1879.
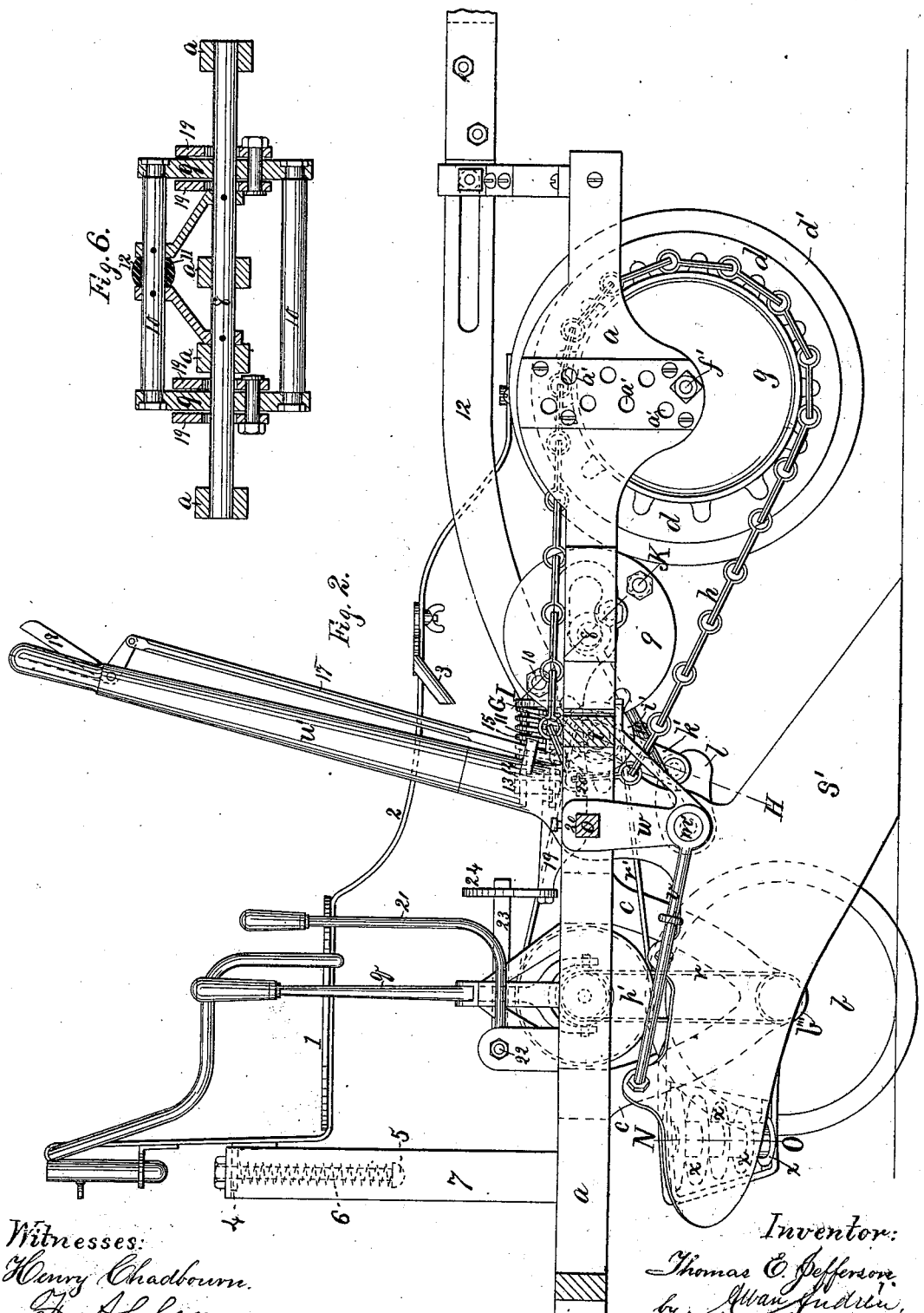
Witnesses:
Henry Chadbourn.
F. Allen.
Inventor:
Thomas E. Jefferson
by Allan Andrew
his atty.

4 Sheets—Sheet 3.
T. E. JEFFERSON.
Sulky-Plow.
No. 215,929. Patented May 27, 1879.
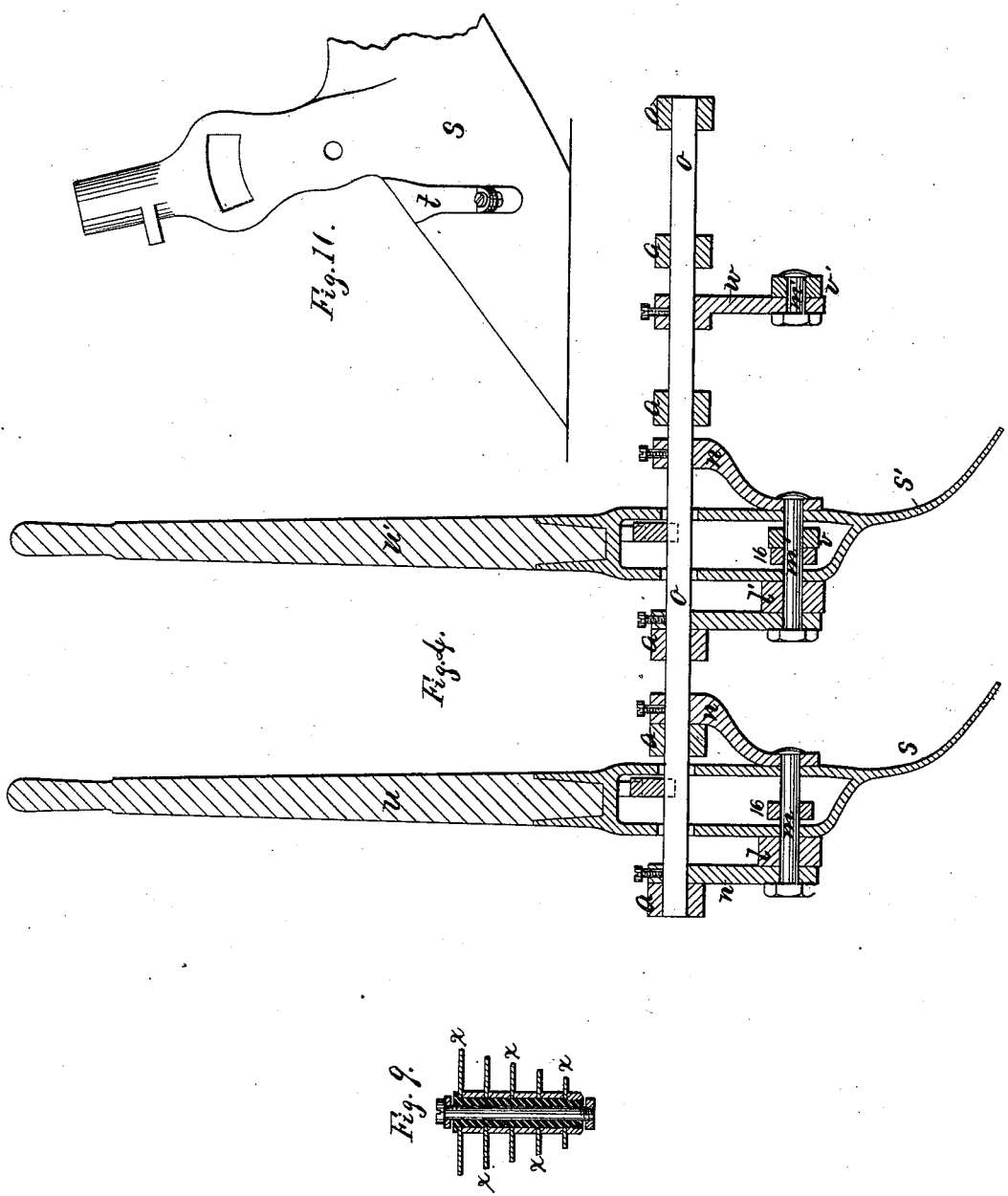
Witnesses:
Henry Chadbourn.
F. Allen.
Inventor:
Thomas E. Jefferson
by A. Van Andrew
his atty.

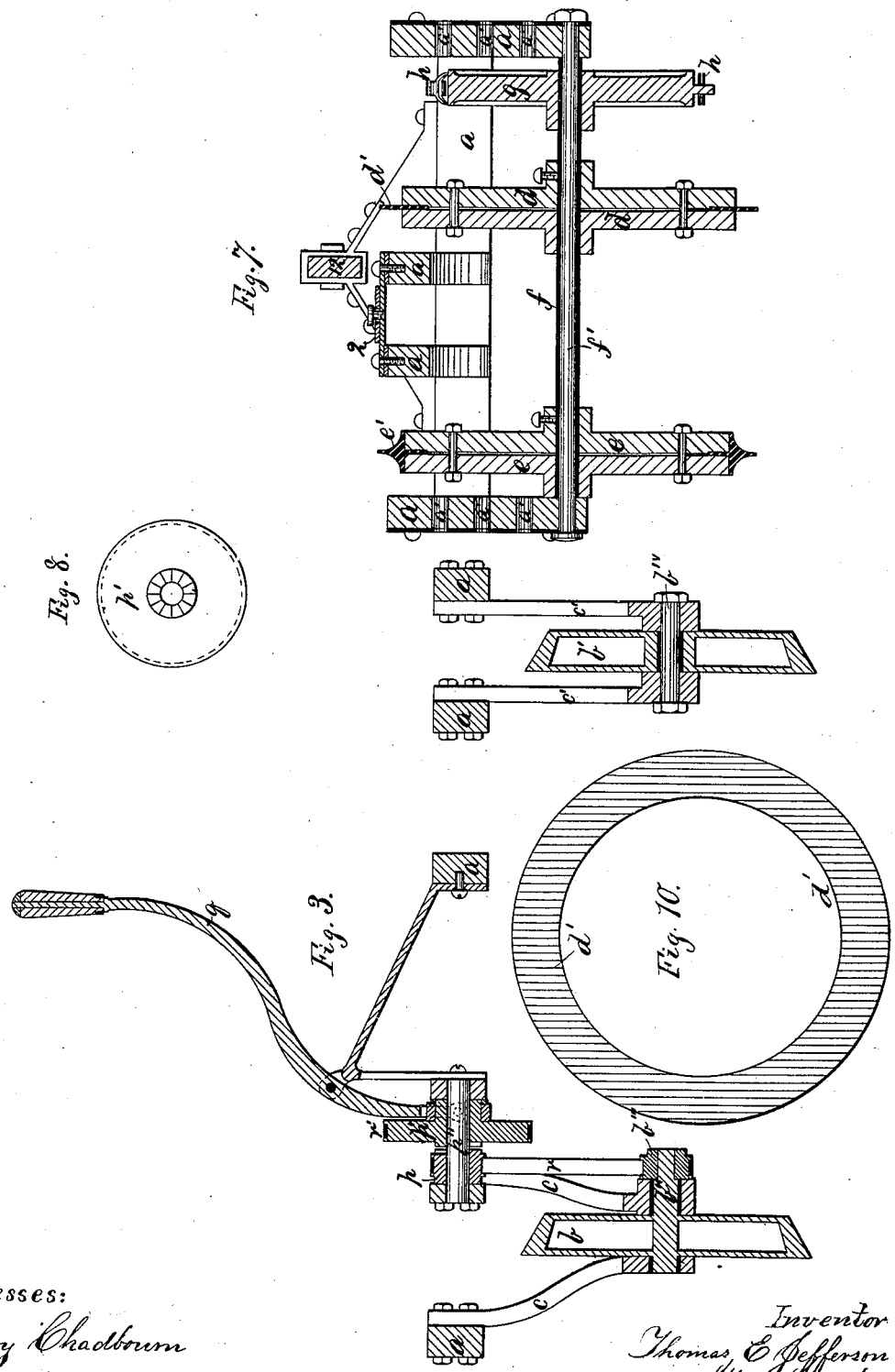

UNITED STATES PATENT OFFICE.

THOMAS E. JEFFERSON, OF BOSTON, MASSACHUSETTS.

IMPROVEMENT IN SULKY-PLOWS.

Specification forming part of Letters Patent No. 215,929, dated May 27, 1879; application filed April 19, 1879.

*To all whom it may concern:*

Be it known that I, THOMAS E. JEFFERSON, of Boston, in the county of Suffolk and State of Massachusetts, have invented certain new and useful Improvements in Sulky-Plows; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to improvements in sulky-plows; and consists in devices, combinations, and arrangements of parts, as will hereinafter be more fully set forth and described.

Heretofore, when gang-plows have been used for ordinary plowing, one plow has been placed more or less in advance of another, in order that the land-side plow might deposit its soil in the furrow made by the furrow-side plow. This system has been adopted to avoid the difficulty of blocking the plows or throwing the soil from the land-side mold-board against the land-side or mold-board of the furrow-side plow; but the method of running one plow behind another is objectionable, because of the inconvenience and labor of handling, elevating, and working any number of plows in this relative position, and also because any increase of distance between the power applied and the work performed correspondingly increases the power required; also, two plows have been used parallel with each other, supported by two wheels adjustable transversely with each other, said wheels being substituted for the land-side of plows, and running in the first and second furrows, respectively. By this method the furrow-side wheel follows and occupies most of the space immediately behind the furrow-side plow, and the plows are adjusted or spread apart to give room for the inverted soil of the land-side plow between the plows, thereby leaving a space of unplowed land between the working-plows, said plows being intended for field cultivation between rows, &c., but not adapted for regular or ordinary plowing when adjusted parallel. Now, I have discovered that a series of light open mold-boards—that is, mold-boards constructed without any land-sides, or any obstructions upon the land-side whatever excepting the sharp cutting points or shares—will work successfully together if hung or placed exactly parallel with each other, and that if the depth of the plows cut is less than the width they cut, the land-side plow will not throw its soil against the mold-board of the furrow-side plow; or where the depth plowed is considerably less than the width cut, the ordinary position of gang-plows can be reversed, and the land-side plow can be placed a little ahead of the furrow-side plow, if necessary, without clogging; but by hanging and working two or more plows exactly parallel with each other, and supporting them upon two rear bearing-wheels placed opposite of each other, and both running in the open furrow, greatly reduces the expense and labor heretofore required in plowing, and avoids most of the difficulty and trouble in elevating the plows for turning or traveling, as a slight elevation of the plow-points, or the point of the land-side plow being followed immediately by the land-side bearing-wheel, quickly forces the land-side plow out of the ground, while the turning or driving the other rear driving-wheel out of the furrow lifts all the plows above the ground, and lifts the forward wheels the same distance above the ground that the bottom of the plows, when working, are below the surface of the ground.

In place of any land-side support for the rear end of the mold-board, or in place of any stays or braces from the beam to the back side of the mold-board, I substitute strong adjustable braces, extending from any desired part of the rear end of the mold-board forward to the fulcrum upon which the plow is supported.

In order to hold the plows perfectly firm, except when desired to move them around its fulcrum, and at the same time to allow the soil to move unobstructed upon the mold-board, the rear end of the braces (one or more) have a thread cut upon them and two nuts placed thereon, between which nuts (or their equivalents) the mold-board can be firmly adjusted, while the brace or braces may be made larger in the center for lightness and strength, and, if necessary, bent upward, to be more out of the way of the soil.

The above-described adjustable braces are intended as an improvement upon former Letters Patent granted to me April 15, 1879, and numbered 214,396, wherein the rear end of the mold-board was supported by a chain connecting said mold-board with the fulcrum upon which the plow swings.

In place of attaching the plows to a beam, as customary, I dispense with a beam altogether, and in place of a solid standard I have an open standard, thereby spreading the bearings and firmly supporting the plow in its position, while permitting it to be moved, as desired, upon its fulcrum. This opening in the standard between the bearings is necessary for the attachment of the supporting-rods to the fulcrum upon which the plow swings.

The bearings and fulcrum are placed as low in the standard as possible without obstructing the earth, in order to facilitate the movement of the plow upon the fulcrum. This fulcrum is attached to the main axle by suitable hanging braces, which prevent any lateral movement of the plow. The standard of the plow extends upward a short distance above the main axle and terminates with a socket, in which is placed an upright lever for moving the plow upon its fulcrum by hand.

The opening in the standard through which the main axle passes is just large enough to allow the standard to move back and forth upon its fulcrum the distance required for elevating and lowering the plow, only one set of levers being required for elevating and lowering the plows either by hand or horse power.

Heretofore swing-plows have been suspended and operated in bearings located in the beams of said plows. This method is objectionable on account of the difficulty of securely fastening, holding, and operating said working-plow, while the fulcrum is so far removed from the work performed in the soil.

My improvement dispenses with a beam altogether, and firmly secures the swinging plow upon a fulcrum in the bifurcated standard of said plow, said fulcrum being located as low down on the standard or as near the soil as possible. By this method swinging plows are held firmer and handled much easier than heretofore.

The movement of the plow upon its fulcrum may be the same whether for deep or shallow plowing—that is, when at work the position of the plow may remain always the same, slightly pitching forward or downward, for the purpose of readily taking all the soil allowed by the forward bearing-wheels. The cutting share or point bends gradually downward to the bottom of the furrow and outward to the land-side, thereby to prevent contact and friction between the land-side and under part of the plow and the soil, and also to utilize the natural wear of the soil upon the cutting-edges, so that the friction of the soil will continually grind the share or point and keep them sharp.

Heretofore revolving disks or colters have been commonly used to cut the soil before the plow.

If the soil is free from rocks and other obstructions, I prefer a thin, light, hollow, circular blade of suitable width to cut the depth required; but if the soil is rocky the cutting blade or rim should be thicker and heavier. By this manner of supporting the blades in the bearing-wheels we not only use a thinner cutting-blade than formerly, but after the blades are worn out they can be easily replaced.

Heretofore bearing-wheels with flanges upon their outer surfaces have been used to prevent the lateral motion of plows; but it is found if these flanges are small and thin, and adapted to use in hard ground with light weight, they are of but little practical use in soft ground with heavy weight, or if the flanges are made wide, and adapted to penetrate the soil sufficiently to hold the plows steady in soft ground, then the weight of the soil and plow will rest upon the flanges when working in hard ground.

My improvement further consists in a concave wedge-shaped rim for the colter or bearing wheels in a sulky-plow.

My invention also consists of a series of loosely-revolving disks located in bearings at the rear of the mold-board, for the purpose of automatically inverting, pulverizing, and laying over the soil without much friction. Said disks may revolve separately or jointly upon their bearings, and may be made adjustable out or in from the center line of the plow, according to the width of the furrow that is to be made or the amount of soil that is to be turned over.

I prefer in using said disks to shorten the mold-board at the rear, so as to let the revolving disks take the place of the rear end of the mold-board.

I find by this means it requires much less power to invert and thoroughly pulverize the soil than it does to simply invert the soil with the ordinary mold-board. As the top of the soil moves faster than the bottom while it is being inverted, it may be necessary to make the series of disks in the form of a cone, placing the largest disk uppermost, so as to give the greatest motion to the upper soil with the least amount of friction; or the disks may be used all of a size, if preferred. For different kinds of plowing, in different kinds of soil, the top of the disk-standard can be made adjustable outward and inward, as required.

My improved seat is adjustable to suit the convenience of the driver, and is intended to keep an upright position at all times.

On the accompanying drawings, Figure 1 is a plan view. Fig. 2 is a section on line A B, shown in Fig. 1. Fig. 3 is a cross-section on line C D, shown in Fig. 1. Fig. 4 is a cross-section on line E F, shown in Fig. 1. Fig. 5 is a cross-section on line G H, shown in Fig. 2.

Fig. 6 is a cross-section on line I K, shown in Fig. 2. Fig. 7 is a cross-section on line L M, shown in Fig. 1. Fig. 8 is a face view of pulley and clutch for operating shear on plow-share; and Fig. 9 is a section of the disks on line N O, shown in Fig. 2. Fig. 10 is a plan view of the annular cutting-blade $d'$, to be attached to the colter-wheel; and Fig. 11 is a view of the land-side of the plow, showing the stationary knife.

Similar letters refer to similar parts wherever they occur on the different parts of the drawings.

$a\ a\ a$ designate the frame-work of the plow. $b\ b'$ are the two rear bearing or furrow wheels, that are made hollow, as shown, so as to be as light as possible consistent with strength. Said wheels are made of the peculiar shape as shown in the drawings, so as to prevent their slipping sidewise under pressure of the soil upon the plows. The wheel $b$ is provided with a solid axle, $b''$, attached to said wheel and running loosely in bearings $c\ c$, attached to frames $a\ a$. The other wheel, $b'$, runs loosely on a stationary axle, $b'''$, that is secured by means of suitable nuts, &c., to the bearings $c'\ c'$, as shown. $d\ d$ and $e\ e$ represent the forward intermediate pulleys, $p$ and $p'$, running loosely on the intermediate shaft, $p''$. The adjoining surfaces of the pulleys $p$ and $p'$ are serrated, so as to serve as a clutch, as shown in Fig. 8, by means of which and the clutch-lever $q$ the said pulleys $p$ and $p'$ may be connected to or disconnected from each other, as may be desired. If the plowing is shallow and the stubble heavy, in that case it may be necessary to operate the crank-shaft $i$ both from the colter-wheel pulley $g$ and its chain $h$, as well as from the bearing-wheel pulley $b'''$, its intermediate pulleys, $p\ p'$, and the chains $r\ r'$; but if the plowing is deep and the stubble light the rotary motion may be conveyed to the crank-shaft $i$ either from the colter-wheel shaft or the bearing-wheel shaft. If the forward pulley, $g$, and its chain $h$ are used for this purpose alone, the crank-shaft $i$ will cease to rotate and the knives $l\ l'$ become stationary the moment the plows leave the furrow, while if the rear pulley, $b'''$, is used the motion of the crank-shaft $i$ and its knives $l\ l'$ will be governed by the clutch-lever $q$, as above described.

S S' are the plows, their forward ends being set parallel with the colter-wheel shaft $f$, that soil as it comes from the mold-board. Said disks may either be adjustable or attached to a revolving shaft, as may be desired.

1 is the self-adjusting spring-seat for the driver to sit on, which seat is provided with a forward-projecting foot-bar, 2, and an adjustable foot-rest, 3, thereon, as shown. At the rear said seat is provided with an ear, 4, that is made to slide on the stationary bolt 5, having a spiral spring, 6, located thereon, upon which the seat is thus resting. The stationary bolt 5 is secured to the upright frame 7, as shown, the latter being attached to the frames $a$ $a$.

8 is the pole-shaft, provided with a pair of oscillating disks or wheels, 9 9, either attached to said pole-shaft and rocking with it or moving loosely on said shaft, in which latter case said shaft remains stationary.

The disks or wheels 9 9 are connected together by means of rod 10 passing through a slotted opening, 11, in the rear of the pole 12, as shown. A pin, 13, is inserted through the rear end of the said pole, against which pin rests a plate, 14, and a yielding spring, 15, for the purpose of allowing the pole to yield when pulled by the animals, and thus ease their work and relieve the plow from sudden shocks when striking against hard substances.

16 16 are braces extending from the pole-shaft 8 to the fulcrum-pins $m$ $m'$. Said braces may be solid rods or links or chains, as may be desired.

17 is a locking-bar on each of the rocking levers $u$ $u'$, which bar is operated in the upper end of each of said levers by means of a small knee-lever, 18, as shown. The lower end of said locking-bar 17 is made to lock into recesses made in the connecting-links 19 19, the forward ends of which are jointed to the wheels or disks 9 9, as shown. In this manner the plows may be raised or lowered on their fulcra by withdrawing the locking-bars 17 17 and moving one or both of the levers $u$ $u'$ accordingly.

The links 19 19 are each provided with recesses 20 20, fitting over the main shaft $o$, by means of which said links are locked to said main shaft in any desired position for elevating or lowering the plow-points.

21 is a lever attached to rock-shaft 22, movable in stationary bearings, and provided with rocking arm 23, the forward end of which is inserted through a perforation in the connecting bridge-piece 24, that connects the rear ends of notched links 19 19, by means of which said links may be simultaneously raised so as to unlock them from the main shaft $o$, when the pulling-strain of the draft-animals on the pole, acting on the rod 10 and disks or wheels 9 9 and links 19 19 and levers $u$ $u'$, will automatically swing the plows on their fulcra, and thus raise the plow-points out of the ground, as may be desired, when the plow comes to the end of the furrow, or at other times when it is desirable to raise the plow-points out of the soil.

What I wish to secure by Letters Patent and claim is—

1. In a sulky-plow, two or more plows, arranged abreast of each other, and having mold-boards or shares of approximately equal length opposite each other, and having between their inclined opposite surfaces an unobstructed space, in order that the slice or turned earth of the land-side share or mold-board may be thrown and inverted into the furrow formed by the furrow-side plow, substantially as described.

2. The combination, with the plows, of the beveled bearing-wheels $b$ $b'$ and the colter-bearing wheels $d$ $e$, whereby the lateral strain is resisted at both ends of the plow, and the same caused to run straight, substantially as described.

3. The combination of the two rear bearing-wheels $b$ $b'$ and the self-locking levers $u$ $u'$, for the purpose of elevating the plows, substantially as set forth.

4. The combination, with the pivoted or fulcrumed plows, of the rigid adjustable braces or stays $v$ $v'$, connected to the rear end of the mold-boards S S', whereby the mold-board may be adjusted in either direction and firmly held in position, substantially as described.

5. The combination of the adjustable braces $v$ $v'$ with the double bearings and fulcrum in the bifurcated levers $u$ $u'$, for the purpose set forth.

6. The bearings and fulcrum in levers $u$ $u'$, as constructed with hanging brackets $n$ $n$ $n$ $n$ from the main axle $o$, as and for the purpose set forth.

7. One or more revolving disks, $x$, arranged at the rear of the mold-board, for the purpose of pulverizing and inverting the soil, substantially as described.

8. The combination of one or more plows, S S', movable on fulcra $m$ $m'$, with braces or stays 16 16 and $v$ $v'$, as and for the purpose set forth.

9. The combination of the notched arms or levers 19 19, rocking wheels 9 9 on shaft 8, main shaft $o$, and levers $u$ $u'$, as and for the purpose set forth.

10. In combination with rocking plows S, locking-lever $u$ and sliding horizontal notched link 19, as and for the purpose set forth.

11. The combination of sliding pole 12, pole-shaft 8, and disks 9 9, as and for the purpose set forth.

12. The combination of the pole 12, spring 15, pole-shaft 8, disks 9 9, and notched levers or links 19 19, as set forth.

13. The wheel $e$, having projecting from its periphery the continuous annular cutting and bearing rim; having a sharp edge and concave faces, substantially as and for the purpose set forth.

14. The herein-described self-adjusting elastic seat 1, with its adjustable foot-rest 3 on the foot-bar 2, ear 4, bolt 5, spring 6, and standard 7, as and for the purpose set forth.

15. The combination of sliding pole 12, pole-shaft 8, oscillating disks 9 9, link 19, and self-locking lever $u$ $u'$ with rear bearing furrow-wheels $b$ $b'$, for the purpose of elevating the plows, substantially as set forth.

16. The plow having the upward-projecting bifurcated standard fulcrumed to and embracing bracket or support $n$ $n$, projecting downward from the frame, substantially as described, and for the purpose set forth.

In testimony that I claim the foregoing as my own invention I have affixed my signature in presence of two witnesses.

THOMAS E. JEFFERSON.

Witnesses:
   ALBAN ANDRÉN,
   HENRY L. HINCKLEY.